UNITED STATES PATENT OFFICE.

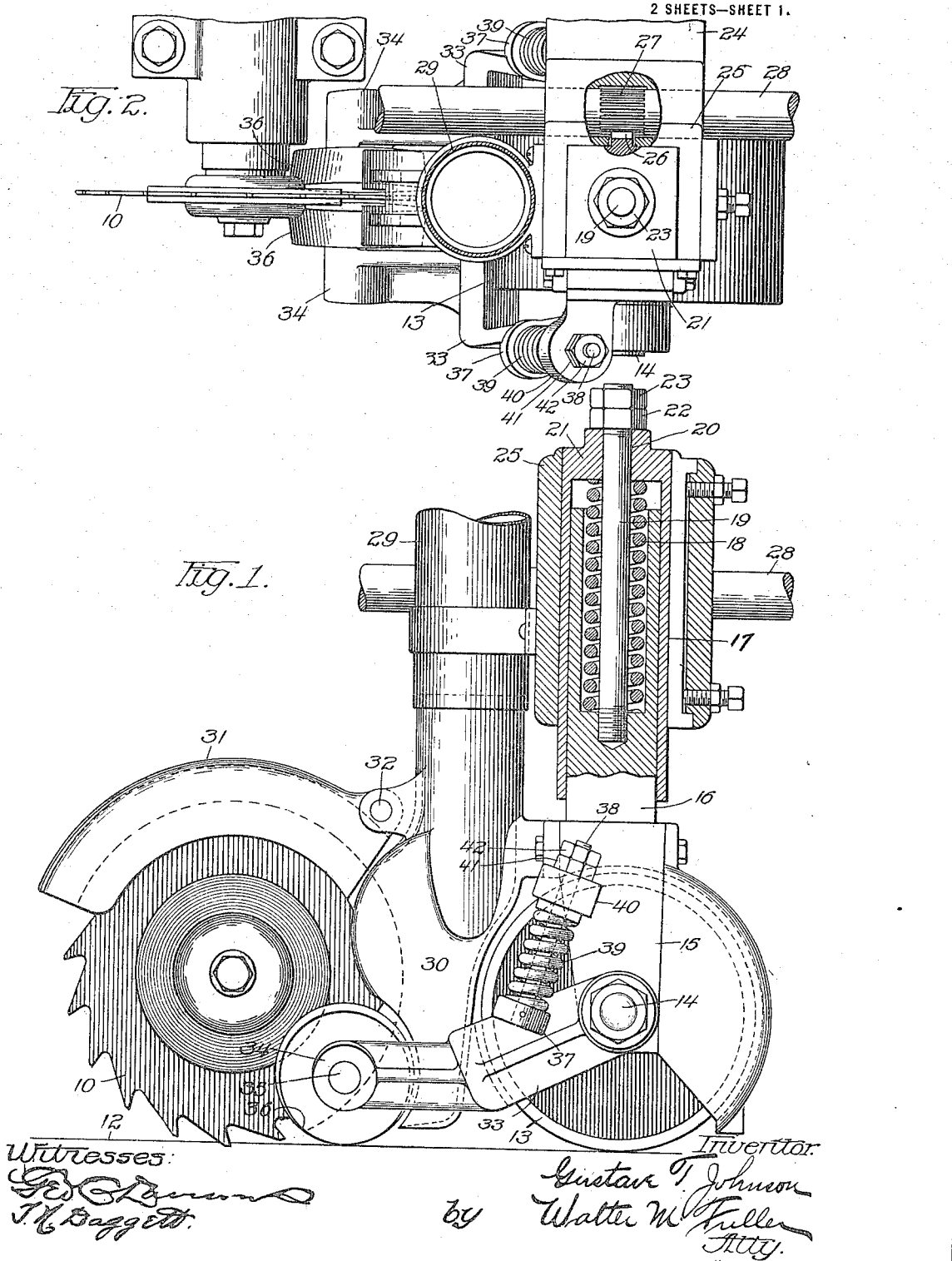

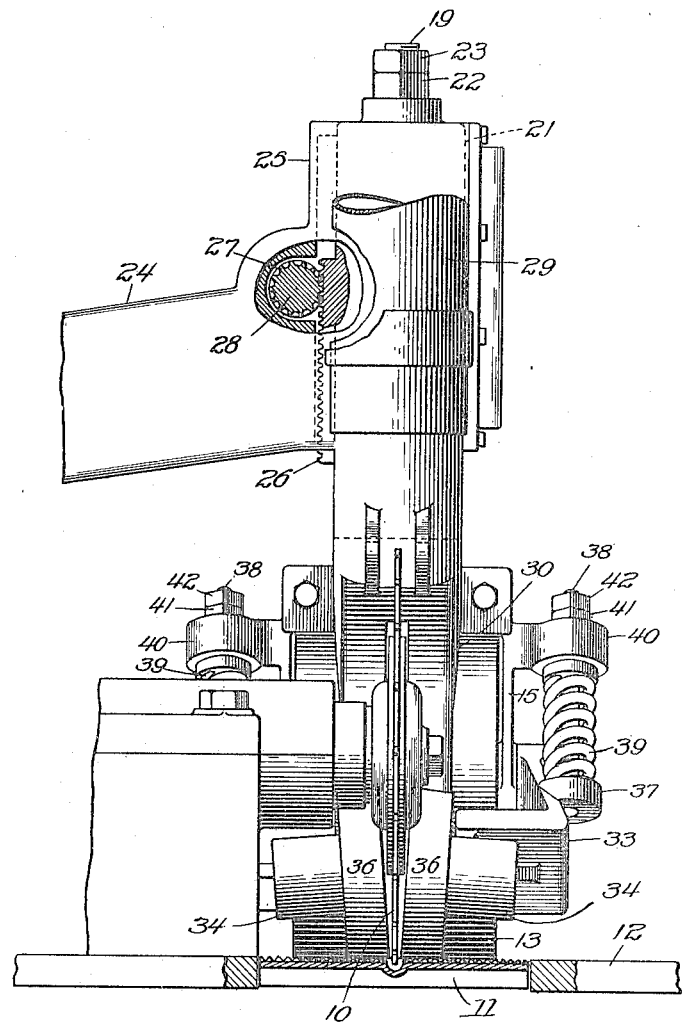

GUSTAVE T. JOHNSON, OF BELOIT, WISCONSIN, ASSIGNOR TO P. B. YATES MACHINE COMPANY, OF BELOIT, WISCONSIN, A CORPORATION OF WISCONSIN.

PRESSURE-ROLLER CONSTRUCTION FOR SAWS.

1,207,764.  Specification of Letters Patent.  Patented Dec. 12, 1916.

Application filed October 7, 1915. Serial No. 54,636.

*To all whom it may concern:*

Be it known that I, GUSTAVE T. JOHNSON, a subject of the King of Sweden, residing at Beloit, in the county of Rock and State of Wisconsin, have invented certain new and useful Improvements in Pressure-Roller Constructions for Saws, of which the following is a specification.

With saws and similar appliances it is of advantage to press or hold down the stock close to the point of action of the saw, particularly when it is operating on short pieces of lumber, to maintain them properly in place and prevent their flying up or being thrown back under the action which the teeth of the saw exerts on them. To accomplish this and other desirable results, in the preferred embodiment of the invention, spring-pressed rollers are so mounted and located as to be on opposite sides of and close to the cutting-edge of the saw, these rollers being independent and canted or inclined to provide a greater clearance opening at the top than at the bottom, thus permitting any splinters which may enter between the rollers and the saw to readily pass out. If a narrow edging is being ripped from the stock one of these rollers holds the edging down to the traveling bed and prevents its being forced back by the saw and these rollers also, by their pressing action toward the traveling bed, hold the work against chattering or vibrating, even when thin stock is being operated upon. In a construction of this improved type, there is also no tendency for the saw to crowd the stock out of a straight line as the work is held firmly to the traveling bed at the point of cutting. Inasmuch as the rollers are independent in their action and are auxiliary or supplemental to the usual pressure-rollers employed in connection with a device of this kind, a thick piece of lumber following a thin piece does not raise the rollers prematurely, and does not remove the pressure from the thin stock until the same has been completely cut. With the accomplishment of these and other objects in view, I have provided a construction, such as is illustrated in the accompanying drawings, forming a part of this specification, and to which reference should be had in connection with the following detailed description, like reference characters referring to the same parts throughout the various views of the drawings.

In these drawings: Figure 1 is a partial side elevation and partial section of the construction referred to; Fig. 2 is a plan view of the structure shown in Fig. 1; and Fig. 3 is an end elevation of the same construction.

In these drawings, it will be observed that the suitably-mounted, revoluble, circular-saw 10 is positioned above an endless traveling bed 11 accommodated, as is customary, in a groove in the table 12. At the infeeding end of such table the usual pressure roller 13 is provided, being mounted on a shaft 14, revoluble in bearings of a yoke 15 on the lower end of an upright hollow cylindrical portion 16 accommodated in a sleeve 17 rectangular in cross-section, the two having interposed between them a coil expansion-spring 18 encircling a rod 19 fixed or pinned at its lower end to the member 16 and extending upwardly through an aperture 20 in the end-wall 21 of sleeve 17, the protruding end of such rod being threaded and having mounted thereon the stop-nut 22 backed up by a lock-nut 23. Obviously, the spring tends to separate the elements 16 and 17, such movement being limited by the co-action of the nut 22 with the wall 21. A bracket 24 is provided with a hub or bearing 25 receiving the nested parts 16 and 17, the latter at one side having a rack 26 operated by means of a pinion 27 formed as a part of or mounted on a shaft 28 provided with a turning handle, not illustrated. Manifestly, as the shaft 28 is turned the pressure-roller 27 may be adjusted toward and from the traveling bed 11 without interference with the adjustment of its holding-down spring 18. To the part 25 a chute or tube 29 is fastened, the lower-end of such tube being connected to a slotted hollow housing 30 into which the saw projects, the sawdust, as is customary in structures of this kind, being drawn away through the communicating members 29 and 30, and, if preferred, a shield 31 for the saw may be pivoted at 32. This construction is old and forms no part of the present invention, except as it coöperates with the other elements hereinafter described.

On each protruding end of shaft 14 a bent rock-arm 33 is hinged, the free end of such arm being provided with a bearing 34 revoluble in which is a shaft 35 carrying at its inner end a roller 36, the lower portion of which is positioned close to the cutting edge of the saw, as illustrated in the various figures of the drawing. The bearing 34, the shaft 35, and its roller 36, are all canted or inclined somewhat as shown in Fig. 3, to provide a greater clearance at the top portion of the roller than at the bottom, and to compensate for such arrangements of the rollers they are beveled so that their lower faces are parallel to the surface of the bed 11. Each of these arms 33 has a perforated lug 37 to which is secured a rod 38 surrounded by a coiled pressure-spring 39, the yoke 11 at each end having an apertured boss 40 through which the rods 38 project, and against which the upper ends of the springs bear, the threaded ends of the rods each having a stop-nut 41 and its associated lock-nut 42. It should be clear from this illustration and description that the rollers 36 are positioned on opposite sides of the saw close to the cutting edge and at its point of action, that they are oppositely canted or inclined to provide the clearance referred to, and that they are independently operable, each being pressed down by its own individual compression spring. It should be observed, furthermore, that these rollers are used in addition to the usual pressure devices in an appliance of this kind, and are not intended ordinarily to replace any other pressure rollers. In action these rollers, by reason of their location on opposite sides of the saw near the cutting edge, hold the stock down at the point of action of the saw thereon, preventing the lumber or any of the parts cut off by the saw from being thrown back, the rollers at the same time eliminating chattering, even when the stock is thin. These rollers also, by reason of their pressing the work toward the traveling bed, prevent the saw from crowding the stock out of a straight line, and because they operate at the points indicated, the entering piece of lumber passing under the pressure-roller 13 does not disturb the action of these rollers on the piece of lumber being severed by the saw, these novel and improved auxiliary rollers at all times holding the work securely until the saw has finished cutting.

The invention herein set forth is defined more particularly by the breadth and scope of the following claims, but it is to be remembered that while one particular embodiment of the invention has been illustrated and described herein, it is susceptible of various other embodiments and is not limited to the precise and exact features of construction presented.

I claim:

1. In an appliance of the character described, the combination of a bed, a saw disposed in a plane substantially perpendicular to the bed, and a pressure-roller adapted to engage the work and located at one side of the saw and close to its face and point of action on the lumber and also inclined to the planes of the saw and bed with the greater space between the roller and saw more remote from the bed, whereby the roller may hold the work close to the point of action of the saw thereon and splinters will not tend to wedge between the saw and roller, substantially as described.

2. In an appliance of the character described, the combination of a bed, a saw, and a pressure-roller adapted to engage the work, and located at one side of the saw and close to its face and point of action on the lumber, said roller being inclined to the plane of the saw and having its surface which engages the work substantially parallel to the bed of the appliance, substantially as described.

3. In an appliance of the character described, the combination of a saw, a pair of spring-pressed pressure-rollers adapted to engage the work and located on opposite sides of the saw and close to its opposite faces and point of action on the lumber, said rollers being oppositely inclined with reference to the plane of the saw, substantially as described.

4. In an appliance of the character described, the combination of a bed, a saw, a pair of independently-operable pressure-rollers adapted to engage the work and located on opposite sides of the saw and close to its opposite faces and point of action on the lumber, said rollers being oppositely-inclined with respect to the plane of the saw and having their faces adapted to engage the lumber substantially parallel to the bed of the appliance, substantially as described.

5. In an appliance of the character described, the combination of a saw-bed, a saw, a main pressure-roller, a spring-pressed mounting for said pressure-roller constructed to permit adjustment of the latter toward and from said bed, a supplemental pressure-roller adapted to engage the work and located at one side of the saw and close to its face and point of action on the lumber, and a spring-pressed support for said supplemental pressure-roller on said mounting, substantially as described.

6. In an appliance of the character described, the combination of a saw bed, a saw, a main pressure-roller, a spring-pressed mounting for said pressure-roller constructed to permit adjustment of the latter toward and from the bed, a pair of supplemental pressure-rollers adapted to engage the work and located on opposite sides of the saw and close to its opposite faces and point of action on the lumber, and a pair of independent supports on said mounting for said supplemental pressure-rollers, substantially as described.

7. In an appliance of the character described, the combination of a saw-bed, a saw, a main pressure-roller, a spring-pressed mounting for said pressure-roller constructed to permit adjustment of the latter toward and from the bed, a pair of supplemental pressure-rollers adapted to engage the work and located on opposite sides of the saw and close to its opposite faces and point of action on the lumber, a pair of arms supporting said supplemental pressure-rollers and hinged to said mounting, and separate springs acting on said arms, substantially as described.

8. In an appliance of the character described, the combination of a saw-bed, a saw, a main pressure-roller, a spring-pressed mounting for said pressure-roller constructed to permit adjustment of the latter toward and from the bed, a supplemental pressure-roller adapted to engage the work and located on one side of the saw and close to its face and point of action on the lumber and inclined to the plane of the saw, and a support for said supplemental pressure-roller on said mounting, substantially as described.

9. In an appliance of the character described, the combination of a saw-bed, a saw, a main pressure-roller, a spring-pressed mounting for said pressure-roller constructed to permit adjustment of the latter toward and from the bed, a pair of supplemental pressure-rollers adapted to engage the work and located on opposite sides of the saw and close to its opposite faces and point of action on the lumber and oppositely inclined to the plane of the saw, and independent supports for said supplemental pressure-rollers on said mounting, substantially as described.

10. In an appliance of the character described, the combination of a saw-bed, a saw, a main pressure-roller, a spring-pressed mounting for said pressure-roller constructed to permit adjustment of the latter toward and from the bed, a pair of supplemental pressure-rollers adapted to engage the work and located on opposite sides of the saw close to its opposite faces and point of action on the lumber, said supplemental pressure-rollers being oppositely-inclined to the plane of the saw and having their faces adapted to engage the lumber parallel to the face of the bed, a pair of supporting arms hinged to said mounting on which said supplemental pressure-rollers are carried, and independent springs acting on said arms, substantially as described.

GUSTAVE T. JOHNSON.

Copies of this patent may be obtained for five cents each, by addressing the "Commissioner of Patents, Washington, D. C."